US007790256B2

(12) United States Patent
Yamasaki et al.

(10) Patent No.: US 7,790,256 B2
(45) Date of Patent: Sep. 7, 2010

(54) COMPOSITE TUBE (75) Inventors: Hiroyuki Yamasaki, Tokyo (JP); Kojiro Inamori, Tokyo (JP); Toshiyuki Andoh, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 533 days.

(21) Appl. No.: 11/905,045

(22) Filed: Sep. 27, 2007

(65) Prior Publication Data
US 2008/0026174 A1 Jan. 31, 2008

Related U.S. Application Data (63) Continuation of application No. PCT/JP2006/306510, filed on Mar. 29, 2006.

(30) Foreign Application Priority Data

Mar. 31, 2005 (JP) .............................. 2005-104622

(51) Int. Cl.
*B29D 22/00* (2006.01)
*B29D 23/00* (2006.01)
*B32B 1/08* (2006.01)

(52) U.S. Cl. .................. 428/36.91; 428/36.9; 428/34.1; 428/36.5; 264/464; 264/45.9

(58) Field of Classification Search ................ 428/36.9, 428/36.91, 36.5, 34.1; 264/464, 45.9
See application file for complete search history.

(56) References Cited

FOREIGN PATENT DOCUMENTS

| JP | 35-10518 B | 8/1960 |
| JP | 54-14470 A | 2/1979 |
| JP | 60-85920 A | 5/1985 |
| JP | 8-156001 A | 6/1996 |

*Primary Examiner*—Michael C Miggins
(74) *Attorney, Agent, or Firm*—Birch, Stewart, Kolasch & Birch, LLP

(57) ABSTRACT

A composite tube formed by covering an outer surface of a tube with a foam, characterized in that: the foam is formed of layers composed of bar-shaped foams; and in a section perpendicular to a longitudinal direction of the foam, each of 40% or more of the bar-shaped foams is formed as a substantially fan-shaped figure formed by long and short arc portions of two large and small concentric circles, respectively, and two linear portions extending radially toward an outer periphery from the center of the concentric circles, with the figure satisfying the condition of formula (1):

$0.5 < a/b < 2.5$   Formula (1)

where a is a length corresponding to ½ of the sum of the lengths of the long arc portion and the short arc portion of a substantially fan-shaped figure, and b is the length of each of the linear portions of the substantially fan-shaped figure.

19 Claims, 3 Drawing Sheets

COMPOSITE TUBE

This application is a Continuation of PCT International Application No. PCT/JP2006/306510 filed on Mar. 29, 2006, which designated the United States, and on which priority is claimed under 35 U.S.C. §120. This application also claims priority under 35 U.S.C. §119(a) on Patent Application No(s). 2005-104622 filed in Japan on Mar. 31, 2005. The entire contents of each of the above documents is hereby incorporated by reference.

TECHNICAL FIELD

The present invention relates to a composite tube, and more specifically, to a composite tube having high heat insulating property and superior workability for use in cold heat medium piping of a heat exchanger, and water-supply/hot-water-supply piping, etc.

BACKGROUND ART

Conventionally, as cold heat medium piping of a heat exchanger, water-supply/hot-water-supply piping, etc., there has been used a composite tube composed of a metal tube or a resin tube whose periphery is covered with a resin foam. In a known method of enhancing the heat insulating performance of such a composite tube, the expansion ratio of the resin foam is increased. It is believed that an increase in expansion ratio leads to enhancement in heat insulating property because of replacement of lots of resin by air, which has low heat conductivity.

As a method of enhancing the expansion ratio of a resin foam, a cross-linking foaming method is available. In the cross-linking foaming method, cross-linking of the resin is effected prior to foaming. Due to high tension of the resin, the method is characterized in that it involves little foam breakage and easily allows an increase in expansion ratio. However, to cover a tube with a cross-linking foam, it is necessary to cut the cross-linking foam in the form of a sheet into strips in conformity with an outer periphery of the tube, and to fuse together end portions of the sheet strips into to form a pipe-like configuration, which takes a lot of time and effort.

In an extrusion foaming method, the covering of the tube is completed simultaneously with extrusion of the resin foam out of a cross-head die, so less time and effort is required as compared with the cross-linking foaming method. However, the resin undergoes basically no cross-linking, so the tension of the resin is rather low, and the expansion ratio is increased not so easily as in the case of the cross-linking foaming method.

One of the factors leading to an increase in expansion ratio in the extrusion foaming method is the configuration of the die outlet. For example, as is known in the art, the expansion ratio is increased more easily when a bar-shaped foam is extruded out of an outlet with a circular section than when a tube-shaped foam is extruded out of an outlet with an annular (donut-shaped) section. This is considered due to the fact that if the sectional area is the same, the circular section has a smaller surface area than that of the annular section, which means the gas is diffused into the atmosphere less easily. In view of this, attempts have been made to obtain a tubular foam of high expansion ratio by bonding or fusing a plurality of bar-shaped foams to each other instead of extruding resin out of an annular die outlet to form a tubular foam. For example, a method is known in which resin is extruded in a bar-shaped (a thin-string-like) form out of a multi-hole die with circular outlets by the extrusion foaming method, and in which the resin bars are fused to each other through foaming to thereby cover a tube while forming a tubular foam (see, for example, Patent Document 1). [Patent Document 1] JP-A-60-85920 ("JP-A" means unexamined published Japanese patent application)

DISCLOSURE OF THE INVENTION

Problems to be Solved by the Invention

However, the possible combinations of the arrangements of the holes of a multi-hole die are innumerable, and it has not been clarified yet how many holes are to be arranged and in what manner to obtain high expansion ratio. To examine this, much trial and error must be repeated, which requires a lot of time and effort. In particular, in the case of a tubular foam which is formed of bar-shaped foams extruded out of holes arranged concentrically in two or more layers and in which the bar-shaped foams are not completely fused and integrated with each other, a special problem is involved when the sections of the bar-shaped foams are deformed into a substantially fan-shaped configuration.

Figure 5:
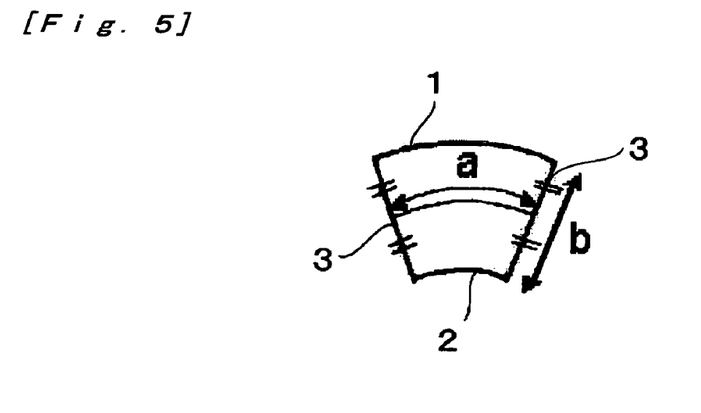
FIG. 5 is a diagram showing a substantially fan-shaped figure and serving to illustrate an aspect ratio thereof.

Here, as shown in FIG. 5, the "substantially fan-shaped configuration" is a configuration formed by a long arc portion 1 of the larger one of two concentric circles, a short arc portion 2 of the smaller one of the two concentric circles, and two linear portions 3, 3 radially extending toward an outer periphery of the concentric circles from the center of the concentric circles.

Next, the problem as mentioned above will be discussed.

Figure 6:
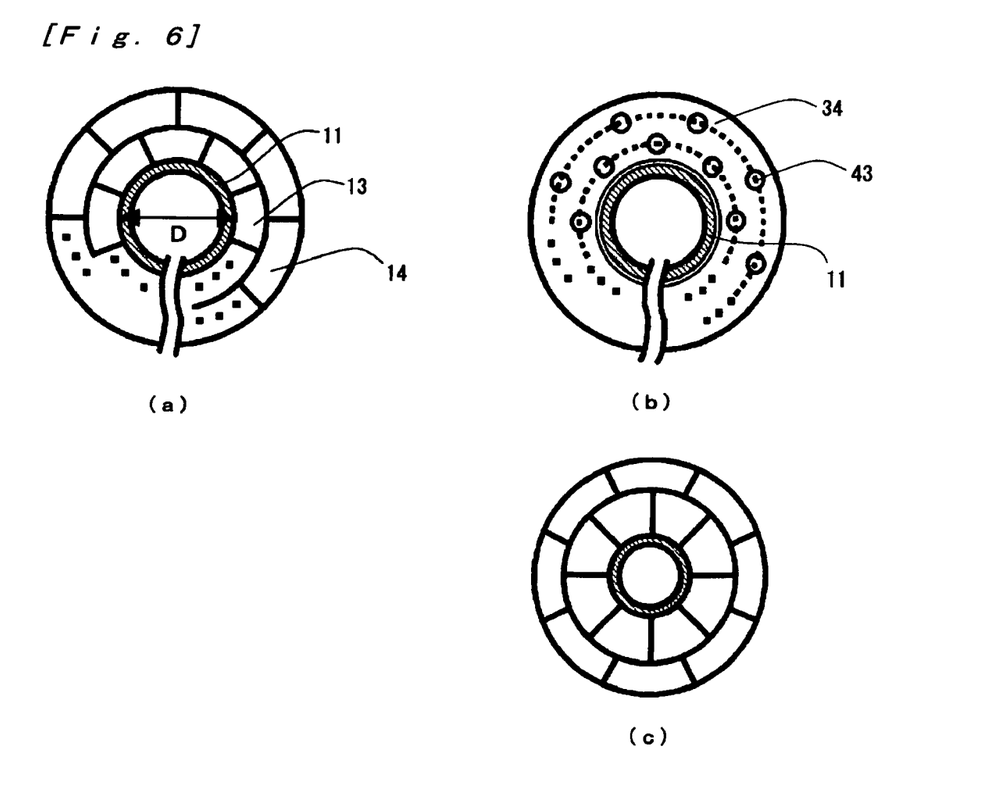
FIG. 6(a) shows a composite tube with a large number of bar-shaped foams.
FIG. 6(b) is a diagram showing an example of the multi-hole die for extruding the foams as shown in FIG. 6(a)
FIG. 6(c) is an explanatory sectional view showing an aspect of a composite tube.

FIG. 6(*a*) is an explanatory sectional view of a composite tube formed by covering a tube 11 with two layers of bar-shaped foams 13, 14. FIG. 6(*b*) is a diagram showing an example of a multi-hole die 34 for forming foams as shown in FIG. 6(*a*). A resin composition in the form of bars extruded out of the multi-hole die foams immediately after the extrusion, and the plurality of bar-shaped foams push each other as the foams grow to be formed into a tubular configuration, with the result that a section of each of the bar-shaped foams is deformed into a substantially fan-shaped configuration, until finally the bar-shaped foams are arranged as shown in FIG. 6(*a*).

As an index indicating the degree to which the section of each of the bar-shaped foams is deformed into a substantially fan-shaped configuration, the aspect ratio of the substantially fan-shaped configuration will be defined as in the following formula (A).

[Mathematical Formula 1]

(Aspect ratio)=*a/b*     Formula (A)

where a is a length corresponding to ½ of the sum of a length of the long arc portion and a length of the short arc portion of a substantially fan-shaped figure, and b is a length of each of the linear portions of the substantially fan-shaped figure.

The parameters in the above formula will be described with reference to FIG. 5. The length corresponding to ½ of the sum of the length of the long arc portion 1 and the length of the short arc portion 2 of a substantially fan-shaped figure is denoted by reference symbol a, and the length of the linear portions 3 of the substantially fan-shaped figure (a thickness of the substantially fan-shaped figure) is denoted by reference symbol b. That is, the aspect ratio (a/b) of the substantially fan-shaped figure is the ratio of the length of the intermediate arc portion of the substantially fan-shaped figure as shown in FIG. 5 to the length of the linear portions 3 thereof. The closer to 1 the aspect ratio is, the less the deformation of the bar-shaped foams becomes. As the aspect ratio of 1 is departed from, the degree of deformation of the bar-shaped foam becomes larger.

In more general terms, assuming that a foam layer in the form of an annular body has n bar-shaped foams, that the inner diameter of the foam layer is D, and that the thickness of the foam layer is T, the sectional aspect ratio of the bar-shaped foams whose section has been deformed into a substantially fan-shaped configuration can also be expressed by the following formula (B):

[Mathematical Formula 2]

$$\text{(Aspect ratio)} = \frac{\pi}{nT}(D+T) \qquad \text{Formula (B)}$$

where n is the number of bar-shaped foams, D is an inner diameter of the foam layer, and T is a thickness of the foam layer.

Next, a specific calculation example of the aspect ratio will be shown. Assuming that the outer diameter of a tube is 10 mm, and that the foam is composed of two layers of which a first layer has eight bar-shaped foams and a thickness of 6 mm and a second layer has eight bar-shaped foams and a thickness of 4 mm, aspect ratios of the substantially fan-shaped figure of the first layer and the substantially fan-shaped figure of the second layer are 1.05 and 2.55, respectively. FIG. 6(c) shows the sectional configuration of a composite tube with foam layers of this example.

In this case, the aspect ratio of the first layer is close to 1, whereas the aspect ratio of the second layer is greatly deviated from 1. That is, the bar-shaped foams of the second layer are to be deformed to more greatly as compared with the bar-shaped foams of the first layer to form a substantially fan-shaped configuration. However, great deformation involves a reduction in expansion ratio due to crushing of the foams, and a deterioration in heat insulating property is to be feared.

It is an object of the present invention to solve the above problem in the prior art and to provide a composite tube and a method of manufacturing the same in which the configuration of the bar-shaped foams forming the resin foam, the number of foams, and the number of die holes are such as will help to obtain a high expansion ratio, whereby covering is effected with a resin foam of high expansion ratio, thereby providing high heat insulating property and superior workability.

Means for Solving the Problems

After careful study, the present inventors have found out that the expansion ratio is easily enhanced and that the heat insulating property of a composite tube can be enhanced with a substantially fan-shaped figure in which the deformation of the bar-shaped foams occurs to a small degree and which satisfies the above-mentioned aspect ratio (a/b) of 0.5 to 2.5, and have made the present invention based on these findings.

According to the present invention, there are provided the following means:

(1) A composite tube formed by covering an outer surface of a tube with a foam, characterized in that: the foam is formed of layers composed of bar-shaped foams; and in a section perpendicular to a longitudinal direction of the foam, each of 40% or more of the bar-shaped foams is formed as the substantially fan-shaped figure formed by long and short arc portions of two large and small concentric circles, respectively, and two linear portions extending radially toward an outer periphery from the center of the concentric circles, with the figure satisfying the condition of the following formula (1):

[Mathematical Formula 3]

$$0.5 < a/b < 2.5 \qquad \text{Formula (1)}$$

where a is a length corresponding to ½ of the sum of the length of the long arc portion and the length of the short arc portion of the substantially fan-shaped figure, and b is the length of each of the linear portions of the substantially fan-shaped figure;

(2) A composite tube formed by covering an outer surface of a tube with a foam, characterized in that: the foam is formed of layers composed of bar-shaped foams; and in a section perpendicular to a longitudinal direction of the foam, each of the bar-shaped foams is formed as a substantially fan-shaped figure formed by long and short arc portions of two large and small concentric circles and two linear portions extending radially toward an outer periphery from the center of the concentric circles, with the figure satisfying the condition of the following formula (1):

[Mathematical Formula 4]

$$0.5 < a/b < 2.5 \qquad \text{Formula (1)}$$

where a is a length corresponding to ½ of the sum of the length of the long arc portion and the length of the short arc portion of the substantially fan-shaped figure, and b is the length of each of the linear portions of the substantially fan-shaped figure;

(3) A composite tube formed by covering the outer surface of a tube with a foam, characterized in that: the foam is formed of layers composed of bar-shaped foams; and the number of bar-shaped foams forming each layer satisfies the condition of the following formula (2):

[Mathematical Formula 5]

$$\frac{\pi}{2.5}\frac{D_{i-1}+T_i}{T_1} < n_i < \frac{\pi}{0.5}\frac{D_{i-1}+T_i}{T_i} (1 \le i \le N) \qquad \text{Formula (2)}$$

where N and i indicate numbers of foam layers, of which N is an integer of 1 or more, and i is an integer of not less than 1 but not more than N; $D_{i-1}$ indicates the maximum distance between surfaces of a foam of the (i-1)th layer as counted from the center; $T_i$ indicates the thickness of the foam of the i-th layer; and $n_i$ indicates the number of bar-shaped foams in the i-th layer;

(4) A composite tube according to any one of the above items (1) through (3), characterized in that the foam is composed of layers formed by fusing or bonding together bar-shaped foams extruded out of a multi-hole die having two or more holes arranged in two or more concentric circles;

(5) A composite tube according to any one of the above items (1) through (4), characterized in that the expansion ratio of the foam is 5 to 30;

(6) A composite tube according to any one of the above items (1) through (5), characterized in that the foam is formed of a polyolefin-based resin;

(7) A composite tube according to any one of the above items (1) through (6), characterized in that the foam is formed of polypropylene;

(8) A composite tube according to any one of the above items (1) through (7), characterized in that the foaming agent of the foam is carbon dioxide gas; and (9) A method of manufacturing a composite tube in which a foaming composition is extruded out of a multi-hole die having two or more holes arranged in one or more concentric circle(s) to cover an outer surface of a tube with a foam, characterized in that the number of holes of the multi-hole die is equal to the number of bar-shaped foams satisfying the condition of the following formula (2):

[Mathematical Formula 6]

$$\frac{\pi}{2.5}\frac{D_{i-1}+T_i}{T_1} < n_i < \frac{\pi}{0.5}\frac{D_{i-1}+T_i}{T_i} (1 \le i \le N) \quad \text{Formula (2)}$$

where N and i indicate numbers of foam layers, of which N is an integer of 1 or more, and i is an integer of not less than 1 but not more than N; $D_{i-1}$ indicates the maximum distance between surfaces of a foam of the (i-1)th layer as counted from the center; $T_i$ indicates the thickness of the foam of the i-th layer; and $n_i$ indicates the number of bar-shaped foams in the i-th layer.

In the present invention, the term "substantially fan-shaped configuration" refers to a configuration as shown in FIG. 5, which is formed by long and short arc portions 1 and 2 of large and small two concentric circles, respectively, and two linear portions 3, 3 extending radially toward the outer periphery from the center of the concentric circles.

Effect of the Invention

The composite tube of the present invention, which is formed by covering a tube with a foam of high expansion ratio, provides both high heat insulating property and superior workability.

The composite tube of the present invention can be easily formed by using a polyolefin-based resin as the foam, and advantageously provides high heat resistance by using polypropylene.

Further, in the composite tube of the present invention, carbon dioxide gas is used as the foaming agent, so the foaming agent imparts little load to the environment.

In the method of manufacturing the composite tube of the present invention, it is possible to suppress unevenness in the foam with which the tube is covered, thus making it possible to provide a composite tube which is uniform and easy to form.

Other and further features and advantages of the invention will appear more fully from the following description, taken in connection with the accompanying drawings.

BRIEF DESCRIPTION OF THE DRAWINGS

FIGS. 6(a), 6(b), and 6(c) each are an explanatory sectional view for illustrating a composite tube covered with two foam layers, of which

DESCRIPTION OF SYMBOLS 11 tube
12 bar-shaped foams
13 bar-shaped foam in first layer
14 bar-shaped foam in second layer
16 bar-shaped foam in i-th layer
18 bar-shaped foam in N-th layer
30 extruder
31 hopper
32 gas supply port
33 crosshead
34 multi-hole die
36 sizing die
41 nipple
43 hole portion

BEST MODE FOR CARRYING OUT THE INVENTION

In the present invention, a sectional configuration of each of the bar-shaped foams forming the foam constituting the covering layer of the composite tube is a substantially fan-shaped configuration as shown in FIG. 5, which is formed by the long arc portion 1, the short arc portion 2, and the two linear portions 3, 3, wherein the aspect ratio (a/b) of the above formula (A) ranges from 0.5 to 2.5, that is, satisfies the condition of the following formula (1):

[Mathematical Formula 7]

$$0.5 < a/b < 2.5 \quad \text{Formula (1)}$$

where a is a length corresponding to ½ of the sum of the length of the long arc portion and the length of the short arc portion of a substantially fan-shaped figure, and b is the length of each of the linear portions of the substantially fan-shaped figure;

When the sectional configuration of the bar-shaped foam is such a substantially fan-shaped configuration, the expansion ratio is easily enhanced, and it is possible to enhance the heat insulating property of the composite tube. Although the reason for this has not been clarified in detail yet, it is to be assumed that when the aspect ratio is departed from 1, great deformation is involved when the section of the bar-shaped foam is turned from a circular into a substantially fan-shaped configuration, so the foam is crushed to a large degree, resulting in a low expansion ratio, while, when the aspect ratio is within the above range, the crushing of the foam occurs to a small degree when the circular section is deformed into a substantially fan-shaped configuration, making it possible to attain a high expansion ratio.

As stated above, when the foam layer is an annular body having an inner diameter of D and a thickness of T, and composed of n bar-shaped foams, the aspect ratio of the formula (A) can also be expressed as in the following formula (B):

[Mathematical Formula 8]

$$\text{(Aspect ratio)} = \frac{\pi}{nT}(D+T) \quad \text{Formula (B)}$$

where n is the number of bar-shaped foams, D is the inner diameter of the foam layer, and T is the thickness of the foam layer.

In this case also, it is desirable for the aspect ratio to be in the range of 0.5 to 2.5, so the following formula (C) is derived through combination and transformation thereof.

[Mathematical Formula 9]

$$\frac{\pi}{2.5}\frac{(D+T)}{T} < n < \frac{\pi}{0.5}\frac{(D+T)}{T} \qquad \text{Formula (C)}$$

where n, D, and T are the same as those of the above formula (B).

By using the above formula (C), it is possible to obtain the range of the proper number n of bar-shaped foams to obtain high expansion ratio when D and T are constant.

While in the above-described case the foam is formed of two layers, the concept of the formula (C) also holds true when the foam is formed of three or more layers.

That is,

[Mathematical Formula 10]

$$\frac{\pi}{2.5}\frac{D_{i-1}+T_i}{T_i} < n_i < \frac{\pi}{0.5}\frac{D_{i-1}+T_i}{T_i}(1 \le i \le N) \qquad \text{Formula (2)}$$

where N and i indicate numbers of foam layers, of which N is an integer of 1 or more, and i is an integer of not less than 1 but not more than N. $D_{i-1}$ indicates the maximum distance between surfaces of a foam of the (i-1)th layer as counted from the center. $T_i$ indicates the thickness of the foam of the i-th layer. $n_i$ indicates the number of bar-shaped foams in the i-th layer.

To obtain high expansion ratio, it is desirable for the sectional configuration of all the bar-shaped foams to satisfy formula (1). In some cases, however, a high expansion ratio can be obtained even if some bar-shaped foams do not satisfy the formula (1). To obtain an expansion ratio of 5 or more, it is desirable for the proportion of the bar-shaped foams satisfying formula (1) to be at least 40% or more of the total sectional area of the foam. When the proportion is short of 40%, the expansion ratio of the foam as a whole does not attain 5 or more, which is required in obtaining a desired heat insulating effect.

Next, a preferred embodiment of the present invention will be described in detail with reference to the accompanying drawings. In the following description, the same components are indicated by the same reference numerals.

Figure 1:
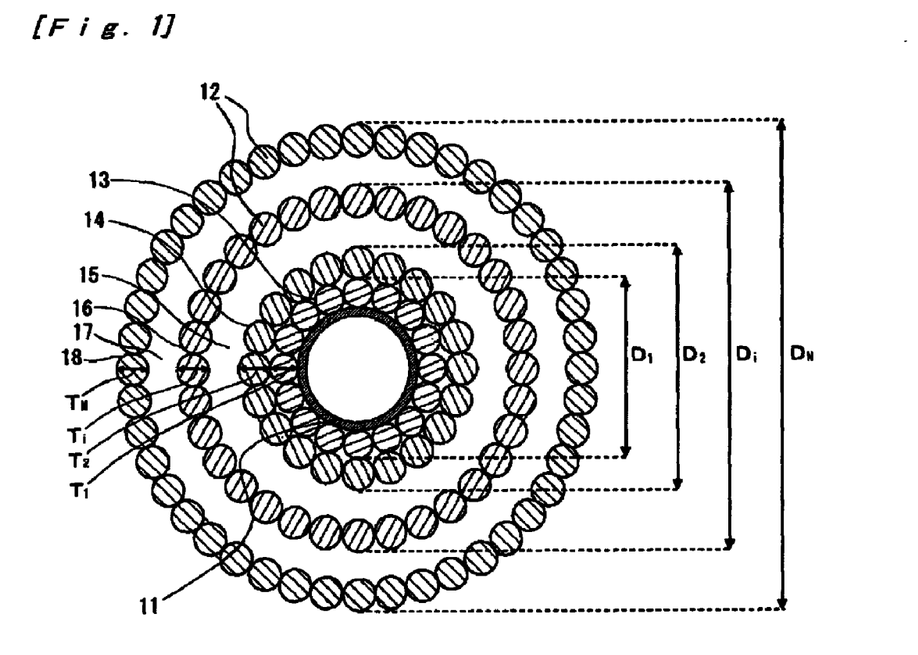
FIG. 1 is a sectional view of a preferable embodiment of the composite tube of the present invention.

FIG. 1 is a sectional view showing a preferred embodiment of the composite tube of the present invention. The composite tube of the present invention is formed by covering an outer surface of a tube 11 with bar-shaped foams 12. The bar-shaped foams 12 are arranged concentrically, and are fused or bonded to each other to form concentric layers, which form a multi cover layer including, from a side nearest to the tube 11, a first layer (formed of bar-shaped foams 13, . . . of FIG. 1), a second layer (formed of bar-shaped foams 14 of FIG. 1), . . . , an i-th layer (formed of bar-shaped foams 16, . . . of FIG. 1), and an N-th layer (formed of bar-shaped foams 18, . . . of FIG. 1). Here, an integer of 1 or more is indicated by reference symbol N and an integer of not less than 1 but not more than N is indicated by reference symbol i. Although not shown, in FIG. 1, bar-shaped foams 12 are also arranged concentrically at portions indicated by reference numerals 15 and 17 to form a multi cover layer. While it is desirable for the respective diameters of the bar-shaped foams 12 to be equal to each other, they may also differ from each other as needed.

As to a method for making a size variation in diameter of the bar-shaped foams, it is possible to use making size variation in hole size of multi-hole-die. This, however, should not be construed to limit the invention.

The bar-shaped foams may extend in a straight line in the longitudinal direction or in a spiral form as long as the section of the foam perpendicular to the longitudinal direction of the foam has a configuration according to the present invention.

While it is only necessary for the bar-shaped foams to be in contact with each other, it is preferable to fuse with or bond them each other. Further, it is preferable that the bar-shaped foams form concentric layers.

As the tube 11 constituting an inner tube of the composite tube of the present invention, it is possible to use a tube formed of a metal, such as copper or iron, or a tube formed of a resin. In the case of a resin tube, it is possible to use, for example, polyethylene, polybutene, polypropylene, or a material obtained by cross-linking of the above-mentioned materials as the material of the tube. This, however, should not be construed restrictively.

For a material constituting the foam of the composite tube of the present invention, any material can be used for any purpose, but a polyolefin-based resin is preferable in view of stability in extrusion and ease of increase in expansion ratio.

Examples of the polyolefin-based resin include low density polyethylene, linear chain low density polyethylene, high density polyethylene, polypropylene, an ethylene propylene rubber, an ethylene propylenediene terpolymer, a styrene butadiene rubber, an ethylene vinyl acetate copolymer, an ethylene vinyl alcohol resin, an ethylene ethylacrylate resin, and an ethylene acrylic resin, but the resin is not limited thereto. Furthermore, modified bodies such as a silane-modified resin and a carboxylic acid-modified resin obtained by modifying each of the above resins can also be used. In addition, each of those resins can be used alone or a mixture of two or more kinds thereof can be used.

Of the above described resins, polypropylene is more preferable from the perspective of high heat resistance. When polypropylene is used as the resin, the polypropylene resin preferably has a melt flow rate (MFR) (230° C.; 2.16 kgf) of 0.05 to 10.0 g/10 min, and an MFR is more preferably 0.5 to 3.0 g/10 min in view of processability in extrusion and foam property.

A bubble nucleus agent, a thermal stabilizer, a processing aid, a lubricant, an impact modifier, a filler, an antioxidant, an ultraviolet absorber, a light stabilizer, a pigment, or the like may be appropriately added to the foam, if required.

In the present specification, the term expansion ratio refers to the average expansion ratio value of the entire tubular foam formed as an assembly of the bar-shaped foams. Assuming that the density of a composition before foaming is $\rho$ (g/cm$^3$), and that the density of the foam is $\rho_f$ (g/cm$^3$), the expansion ratio $\phi$ of the foam can be defined by the following formula (3):

[Mathematical Formula 11]

$$\phi = \rho/\rho_f \qquad \text{Formula (3)}$$

It is preferable that the expansion ratio of the foam be not less than 5 but not more than 30, When the expansion ratio of the foam is less than 5, the heat insulating property of the composite tube is insufficient. On the other hand, when it exceeds 30, the convective heat transfer increases, resulting in a poor heat insulating property. When the expansion ratio is excessively high, the foams will crush each other, so there is left little space in the foams allowing entrance of air, resulting in a poor heat insulating property. Taking the heat insulating property into consideration, it is more preferable that the expansion ratio of the foam be not less than 5 but not more than 20, and particularly preferably, not less than 10 but not more than 15.

Figure 2:
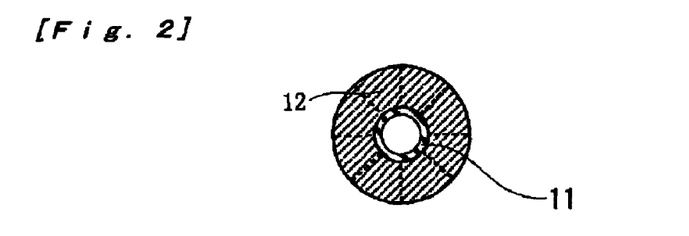
FIG. 2 is a diagram showing a configuration of a foam exhibiting a high expansion ratio after extrusion.

The degree of deformation of a section of each of the bar-shaped foams 12 differs depending on the expansion ratio. When the expansion ratio is low, the section is substantially circular as shown in FIG. 1, and the bar-shaped foams 13 . . . and the bar-shaped foams 14 . . . are only partially fused to each other at the adjacent portions thereof, leaving voids among the bar-shaped foams. On the other hand, when the expansion ratio is high, the section of each of the bar-shaped foams 12 are substantially fan-shaped as shown in FIG. 2, with scarcely any voids being left between the foams.

In the present invention, there exist interfaces between the bar-shaped foams 13, 14, which are not completely fused to be integrated with each other to form a tubular foam as in the prior art technique (e.g., JP-A-60-85920).

The composite tube of the present invention is produced, for example, by covering the outer surface of the tube 11 with resin foams by an extrusion foaming method. In the extrusion foaming method, a foaming agent is supplied to an extruder together with the resin, and foaming is effected simultaneously with extrusion of resin from the die. According to this method, the resin is foamed, and at the same time, covering of the tube is completed, thus forming a composite tube.

A gas-foaming agent, an evaporative foaming agent, a chemical foaming agent, or the like can be used as the foaming agent. A nitrogen gas, a carbonic acid gas, or the like can be used as the gas-foaming agent. Butane, pentane, methanol, water, or the like can be used as the evaporative foaming agent, and azodicarbonamide, azobisisobutyronitrile, N,N-dinitrosopentamethylenetetramine, p-toluenesulfonylhydrazide, p,p'-oxybis(benzenesulfonyl hydrazide), or the like can be used as the chemical foaming agent. However the foaming agent is not limited thereto. Of the foaming agents, the gas-foaming agent is preferable in view of effect on environment. A nitrogen gas or a carbonate gas is more preferable, and a carbonate gas is particularly preferable.

The die used in the present invention is a multi-hole die having holes in a number corresponding to the number of bar-shaped foams according to the formula (2). As shown in FIG. 6(b), in the multi-hole die, two or more hole portions 43 are arranged in one or more concentric circles of different diameters. Further, the holes situated on an outer surface side are in a larger number than the holes situated on a center side. As for the arrangement of the holes in the concentric circles, their positions may be staggered as appropriate by rotating the whole holes in a concentric circle. With this arrangement, bar-shaped foams are extruded from the multi-hole die having two or more holes arranged in one or more concentric circles, and are fused or bonded to each other to form layers.

Regarding the sectional configuration of the die holes, it is preferable that the ratio of the surface area to the sectional area is small, and a circle in which this ratio is the smallest is particularly preferable. However, it may also be polygonal or elliptical as needed.

Immediately after the foams leave the die, the composite tube is passed through a sizing die, whereby asperity of the surface can be smoothened out. As the sizing die, it is possible to use a metal cylinder or the like having an inner diameter adjusted to be equal to an outer diameter of the target composite tube. However, this should not be construed restrictively.

Figure 3:
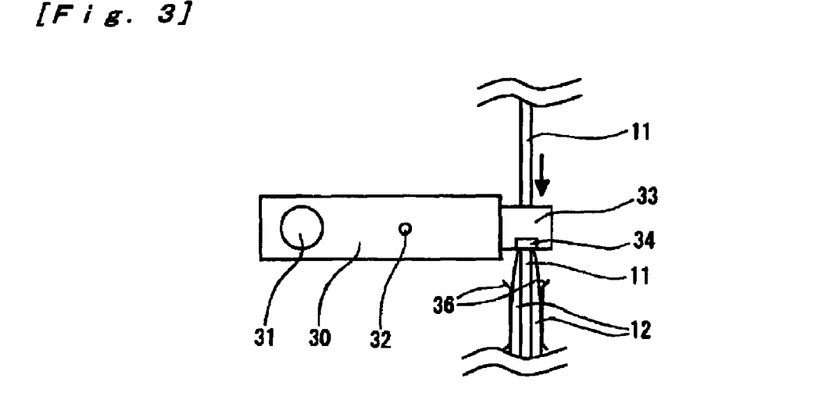
FIG. 3 is a side view of a tube covering device.
Figure 4:
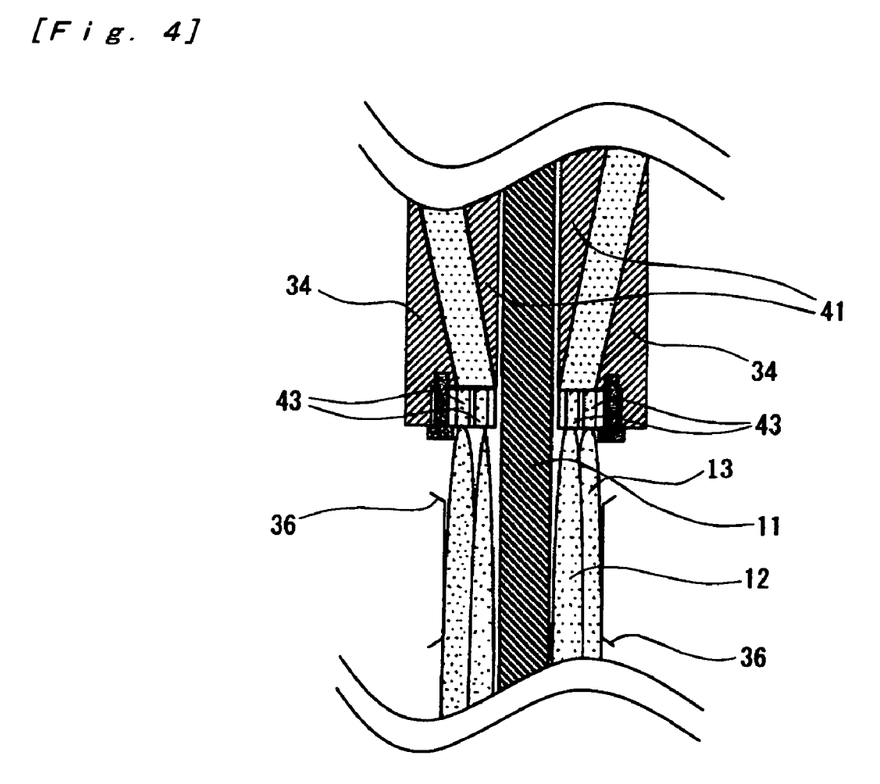
FIG. 4 is an enlarged sectional view of a part of FIG. 3.

Next, an example of the method of manufacturing the composite tube of the present invention will be described with reference to FIGS. 3 and 4. However, the following description of the example should not be construed restrictively. FIG. 3 is a side view of a tube covering device, which includes an extruder 30 equipped with a hopper 31, a gas injection valve 32, a crosshead 33, and a die 34, and a shaping machine (sizing die) 36. FIG. 4 is an enlarged sectional view of the die 34 and the shaping machine 36 of FIG. 3.

A resin composition can be supplied to the hopper 31, and a gas foaming agent can be supplied to the gas injection valve 32. The tube 11 is passed through the crosshead 33 from above, and the resin composition is extruded from the die 34 provided under the crosshead 33, making it possible to cover the tube 11 with the resin composition. The tube 11 covered with the resin composition passed through the crosshead 33 is shaped by the shaping machine 36 provided on the downstream side.

The method of manufacturing a composite tube according to the present invention will be described specifically.

First, a resin composition composed of a resin, a foaming agent, and other additives is supplied to the hopper 31 of the extruder 30. The extruder 30 may be a uniaxial extruder or a biaxial extruder. It is also possible to combine the two to form a tandem extrusion system. Taking the foaming property into consideration, it is preferable to use a tandem extrusion system. When using a gas foaming agent, it is possible to inject gas from the gas injection valve 32 provided in the side surface of the extruder 30.

The resin composition, supplied to the hopper 31, advances through the extruder 30, and is conveyed through the crosshead 33 to a flow passage between a nipple 41 and the die 34 shown in the enlarged sectional view of FIG. 4. Further, it is extruded through the hole portions 43 of the die, and foams, and at the same time, is conveyed to the exterior while covering the tube 11 supplied to the crosshead 33. The tube 11 and the resin foam extruded from the die 34 pass through the shaping machine 36, whereby it is possible to obtain a composite tube with a smoothly shaped surface.

Further, to protect the surface, it is also possible to cover the composite tube, whose surface has been shaped smoothly, with a sheath. As a material of the sheath, it is possible to use a polyolefin-based resin or the like as mentioned above. However, this should not be construed restrictively. The sheath material may have foamed or not.

As stated above, the above-described manufacturing method is an example for carrying out the present invention, and should not be construed restrictively; any other method may be adopted as long as it helps to carry out the present invention.

EXAMPLES

In the following, the present invention will be described in more detail based on examples, but the invention should not be construed restrictively.

Example 1

In a manufacturing equipment shown in FIG. 3, a tandem extrusion system was used as the extruder A φ40 mm uniaxial extruder was used as a first stage extruder of the tandem extrusion system, and a φ65 mm uniaxial extruder was used as a second stage extruder of the same. As the die, there was used a multi-hole die in which eight holes were arranged in one concentric circle.

Next, 1 part by mass of talc (Talc MG (trade name) manufactured by Nippon Talc, Co. Ltd.) was added to 100 parts by mass of polypropylene (SD 632 (trade name) manufactured by SunAllomer, Ltd.; MFR=3.0 g/10 min (230° C., 2.16 kgf)) to prepare a resin foam forming material. Further, the cylinder temperature of the first stage extruder was set to the range of 170° C. to 220° C., the temperature of the second stage extruder was set to the range of 175° C. to 220° C., and the die temperature was set to 170° C.

The prepared resin foam forming material is supplied to the first stage extruder. Further, as the foaming agent, carbon dioxide gas was supplied from a gas supply valve provided in the side surface of the first stage extruder in a proportion of 3.2 mass % with respect to the extrusion amount. Next, the resin foam forming material in which the gas has been dissolved is extruded from the multi-hole die, and at the same time, a copper tube with a diameter of 15.9 mm was covered with the material, whereby a composite tube was obtained. The composite tube obtained by covering the copper tube with the material was supplied to a sizing die installed at an outlet of the multi-hole die and having an inner diameter of 35.9 mm to smoothen the surface of the composite tube. The composite tube whose surface has been smoothened out was supplied to the second extruder (not shown) to be covered with a sheath before foaming of a polyethylene resin with a thickness of 1 mm. Finally, the composite tube covered with the sheath was cut in a length of 20 m, and was taken up in a coil-like fashion. In this way, there was prepared a composite tube with a foam thickness of 10 mm. The expansion ratio was 13.7 (exclusive of the sheath).

Example 2

A composite tube was prepared in the same manner as in Example 1 except that the multi-hole die was changed to one in which 10 holes were arranged in a single concentric circle.

Example 3

A composite tube with a foam thickness of 5 mm was prepared in the same manner as in Example 1 except that the inner diameter of the sizing die was 25.9 mm and that the multi-hole die was changed to one in which 12 holes were arranged in a single concentric circle.

Example 4

A composite tube with a foam thickness of 5 mm was prepared in the same manner as in Example 1 except that the inner diameter of the sizing die was 25.9 mm and that the multi-hole die was changed to one in which 16 holes were arranged in a single concentric circle.

Comparative Example 1

A composite tube was prepared in the same manner as in Example 1 except that the multi-hole die was changed to one in which 3 holes were arranged in a single concentric circle.

Comparative Example 2

A composite tube was prepared in the same manner as in Example 1 except that the multi-hole die was changed to one in which 20 holes were arranged in a single concentric circle.

Comparative Example 3

A composite tube was prepared in the same manner as in Example 3 except that the multi-hole die was changed to one in which 5 holes were arranged in a single concentric circle.

Comparative Example 4

A composite tube was prepared in the same manner as in Example 3 except that the multi-hole die was changed to one in which 30 holes were arranged in a single concentric circle.

The expansion ratios of the composite tubes obtained in Examples 1 through 4 and Comparative Examples 1 through 4 were measured by an underwater substitution method according to JIS K 7112, Table 1 shows values obtained by the measurement and results attained.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Tube diameter | 15.9 | 15.9 | 15.9 | 15.9 | 15.9 | 15.9 | 15.9 | 15.9 |
| Foam thickness | 10 | 10 | 5 | 5 | 10 | 10 | 5 | 5 |
| Range | $3.3 < n < 16.3$ | $3.3 < n < 16.3$ | $5.4 < n < 26.6$ | $5.4 < n < 26.6$ | $3.3 < n < 16.3$ | $3.3 < n < 16.3$ | $5.4 < n < 26.6$ | $5.4 < n < 26.6$ |
| Number of holes in one layer | 8 | 10 | 12 | 16 | 3 | 20 | 5 | 30 |
| Aspect Ratio | 1.023 | 0.818 | 1.11 | 0.833 | 2.727 | 0.409 | 2.665 | 0.444 |
| Number of concentric circles | 1 | 1 | 1 | 1 | 1 | 1 | 1 | 1 |
| Expansion ratio | 13.7 | 16.8 | 12.5 | 10.0 | 3.9 | 3.2 | 3.7 | 2.8 |
| Schematic view of foam section | | | | | | | | |

As is apparent from the results of Table 1, in Comparative Examples 1 through 4, the expansion ratio was as low as 2.8 to 3.9, and the volume of air (whose heat conductivity is lower than that of the foam) allowed to enter the foam was small, resulting in a rather poor heat insulating property. Thus, it was impossible to obtain a desired heat insulating property.

In contrast, Examples 1 through 4 exhibited a high expansion ratio of 10.0 to 16.8, thus proving satisfactory heat insulating property.

Example 5

The manufacturing equipment, operating conditions, and the resin foam forming material were the same as those of Example 1, A composite tube with a foam thickness of 10 mm was prepared in the same manner as in Example 1 except that the die was changed to a multi-hole die in which holes are arranged in two concentric circles, with 14 holes being arranged in the center side concentric circle and 20 holes in the outer surface side concentric circle. The expansion ratio was 17.8 (exclusive of the sheath).

Example 6

A composite tube was prepared in the same manner as in Example 5 except that the multi-hole die was changed to one in which 16 holes were arranged in the center side concentric circle and in which 22 holes were arranged in the outer surface side concentric circle.

Example 7

A composite tube was prepared in the same manner as in Example 5 except that the multi-hole die was changed to one in which 16 holes were arranged in the center side concentric circle and in which 16 holes were arranged also in the outer surface side concentric circle.

Example 8

A composite tube was prepared in the same manner as in Example 5 except that the multi-hole die was changed to one in which 20 holes were arranged in the center side concentric circle and in which 14 holes were arranged in the outer surface side concentric circle.

Example 9

A composite tube was prepared in the same manner as in Example 5 except that the multi-hole die was changed to one in which 18 holes were arranged in the center side concentric circle and in which 12 holes were arranged in the outer surface side concentric circle.

Example 10

A composite tube was prepared in the same manner as in Example 5 except that the multi-hole die was changed to one in which 5 holes were arranged in the center side concentric circle and in which 20 holes were arranged in the outer surface side concentric circle.

Example 11

A composite tube was prepared in the same manner as in Example 5 except that the multi-hole die was changed to one in which 30 holes were arranged in the center side concentric circle and in which 20 holes were arranged in the outer surface side concentric circle.

Example 12

A composite tube was prepared in the same manner as in Example 5 except that the multi-hole die was changed to one in which 14 holes were arranged in the center side concentric circle and in which 7 holes were arranged in the outer surface side concentric circle.

Example 13

A composite tube was prepared in the same manner as in Example 5 except that the multi-hole die was changed to one in which 14 holes were arranged in the center side concentric circle and in which 40 holes were arranged in the outer surface side concentric circle.

Comparative Example 5

A composite tube was prepared in the same manner as in Example 5 except that the multi-hole die was changed to one in which 5 holes were arranged in the center side concentric circle and in which 7 holes were arranged in the outer surface side concentric circle.

Comparative Example 6

A composite tube was prepared in the same manner as in Example 5 except that the multi-hole die was changed to one in which 30 holes were arranged in the center side concentric circle and in which 40 holes were arranged in the outer surface side concentric circle.

As in the above examples, the expansion ratios of the composite tubes obtained in Examples 5 through 13 and Comparative Examples 5 and 6 were measured by the underwater substitution method. Tables 2-1 and 2-2 show values obtained by the measurement and results achieved.

TABLE 2-1

|  | Example 5 | Example 6 | Example 7 | Example 8 | Example 9 | Example 10 |
|---|---|---|---|---|---|---|
| Tube diameter | 15.9 | 15.9 | 15.9 | 15.9 | 15.9 | 15.9 |
| Foam thickness | 10 | 10 | 10 | 10 | 10 | 10 |
| Inner layer thickness | 5 | 5 | 5 | 5 | 5 | 5 |
| Outer layer thickness | 5 | 5 | 5 | 5 | 5 | 5 |
| Inner layer range | $5.3 < n < 26.2$ | $5.3 < n < 26.2$ | $5.3 < n < 26.2$ | $5.3 < n < 26.2$ | $5.3 < n < 26.2$ | $5.3 < n < 26.2$ |
| Outer layer range | $7.8 < n < 38.8$ | $7.8 < n < 38.8$ | $7.8 < n < 38.8$ | $7.8 < n < 38.8$ | $7.8 < n < 38.8$ | $7.8 < n < 38.8$ |
| Number of holes in inner layer | 14 | 16 | 16 | 20 | 18 | 5 |
| Aspect ratio | 0.937 | 0.82 | 0.82 | 0.656 | 0.729 | 2.624 |
| Sectional area proportion | 0.403 | 0.403 | 0.403 | 0.403 | 0.403 | 0.403 |
| Number of holes in outer layer | 20 | 22 | 16 | 14 | 12 | 20 |

TABLE 2-1-continued

| | | | | | | |
|---|---|---|---|---|---|---|
| Aspect ratio | 0.97 | 0.882 | 1.212 | 1.386 | 1.617 | 0.97 |
| Sectional area proportion | 0.597 | 0.597 | 0.597 | 0.597 | 0.597 | 0.597 |
| Number of concentric circles | 2 | 2 | 2 | 2 | 2 | 2 |
| Expansion ratio | 17.8 | 16.9 | 15.7 | 14.5 | 13.5 | 11.8 |
| Schematic view of foam section |  |  |  |  |  |  |

| | Example 11 | Example 12 | Example 13 | Comparative Example 5 | Comparative Example 6 |
|---|---|---|---|---|---|
| Tube diameter | 15.9 | 15.9 | 15.9 | 15.9 | 15.9 |
| Foam thickness | 10 | 10 | 10 | 10 | 10 |
| Inner layer thickness | 5 | 5 | 5 | 5 | 5 |
| Outer layer thickness | 5 | 5 | 5 | 5 | 5 |
| Inner layer range | 5.3 < n < 26.2 | 5.3 < n < 26.2 | 5.3 < n < 26.2 | 5.3 < n < 26.2 | 5.3 < n < 26.2 |
| Outer layer range | 7.8 < n < 38.8 | 7.8 < n < 38.8 | 7.8 < n < 38.8 | 7.8 < n < 38.8 | 7.8 < n < 38.8 |
| Number of holes in inner layer | 30 | 14 | 14 | 5 | 30 |
| Aspect ratio | 0.437 | 0.937 | 0.937 | 2.624 | 0.437 |
| Sectional area proportion | 0.403 | 0.403 | 0.403 | 0.403 | 0.403 |
| Number of holes in outer layer | 20 | 7 | 40 | 7 | 40 |
| Aspect ratio | 0.97 | 2.772 | 0.485 | 2.772 | 0.485 |
| Sectional area proportion | 0.597 | 0.597 | 0.597 | 0.597 | 0.597 |
| Number of concentric circles | 2 | 2 | 2 | 2 | 2 |
| Expansion ratio | 10.6 | 7.9 | 6.6 | 4.2 | 3.7 |
| Schematic view of foam section |  |  |  |  | |

As is apparent from the results shown in Table 2-2, in Comparative Example 5, the aspect ratio was in excess of 2.5 in both the inner layer and the outer layer, and, in Comparative Example 6, the aspect ratio was less than 0.5 in both layers. Thus, in both comparative examples, the expansion ratio was less than 5.

In contrast, as shown in Tables 2-1 and 2-2, all of Examples 5 through 13 exhibited a high expansion ratio of 6.6 to 17.8, In particular, in Examples 5 through 9, the aspect ratio was in the range of 0.5 to 2.5 in both the inner and outer layers. In Examples 10 and 11, the aspect ratio of the outer layer, in which the sectional area proportion of the bar-shaped foams was in excess of 50%, was 0.97, and the expansion ratio was as high as 10.6 to 17.8, In Examples 12 and 13, the aspect ratio of the inner layer, in which the sectional area proportion was in excess of 40%, was 0.937, and these examples exhibited expansion ratios of 7.9 and 6.6, respectively, which are both not less than 5,

INDUSTRIAL APPLICABILITY

The composite tube of the present invention can be preferably used in cold-heat medium piping of a heat exchanger and water-supply/hot-water-supply piping, because it provides both high heat insulating property and excellent workability.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A composite tube formed by covering an outer surface of a tube with a foam, characterized in that: the foam is formed of layers composed of bar-shaped foams; and in a section perpendicular to a longitudinal direction of the foam, each of 40% or more of the bar-shaped foams is formed as a substantially fan-shaped figure formed by long and short arc portions of two large and small concentric circles, respectively, and two linear portions extending radially toward an outer periphery from the center of the concentric circles, with the figure satisfying the condition of the following formula (1):

[Mathematical Formula 1]

$$0.5 < a/b < 2.5 \quad \text{Formula (1)}$$

where a is a length corresponding to ½ of the sum of the length of the long arc portion and the length of the short arc portion of the substantially fan-shaped figure, and b is the length of each of the linear portions of the substantially fan-shaped figure.

2. A composite tube according to claim 1, characterized in that the foam is composed of layers formed by fusing or bonding together bar-shaped foams extruded out of a multi-hole die having two or more holes arranged in two or more concentric circles.

3. A composite tube according to claim 1, characterized in that the expansion ratio of the foam is 5 to 30.

4. A composite tube according to claim 1, characterized in that the foam is formed of a polyolefin-based resin.

5. A composite tube according to claim 1, characterized in that the foam is formed of polypropylene.

6. A composite tube according to claim 1, characterized in that the foaming agent of the foam is carbon dioxide gas.

7. A composite tube formed by covering an outer surface of a tube with a foam, characterized in that: the foam is formed of layers composed of bar-shaped foams; and in a section perpendicular to a longitudinal direction of the foam, each of the bar-shaped foams is formed as a substantially fan-shaped figure formed by long and short arc portions of two large and small concentric circles and two linear portions extending radially toward an outer periphery from the center of the concentric circles, with the figure satisfying the condition of the following formula (1):

[Mathematical Formula 2]

$$0.5 < a/b < 2.5 \quad \text{Formula (1)}$$

where a is a length corresponding to ½ of the sum of the length of the long arc portion and the length of the short arc portion of the substantially fan-shaped figure, and b is the length of each of the linear portions of the substantially fan-shaped figure.

8. A composite tube according to claim 7, characterized in that the foam is composed of layers formed by fusing or bonding together bar-shaped foams extruded out of a multi-hole die having two or more holes arranged in two or more concentric circles.

9. A composite tube according to claim 7, characterized in that the expansion ratio of the foam is 5 to 30.

10. A composite tube according to claim 7, characterized in that the foam is formed of a polyolefin-based resin.

11. A composite tube according to claim 7, characterized in that the foam is formed of polypropylene.

12. A composite tube according to claim 7, characterized in that the foaming agent of the foam is carbon dioxide gas.

13. A composite tube formed by covering the outer surface of a tube with a foam, characterized in that: the foam is formed of layers composed of bar-shaped foams; and the number of bar-shaped foams forming each layer satisfies the condition of the following formula (2):

[Mathematical Formula 3]

$$\frac{\pi}{2.5} \frac{D_{i-1} + T_i}{T_1} < n_i < \frac{\pi}{0.5} \frac{D_{i-1} + T_i}{T_i} (1 \leq i \leq N) \quad \text{Formula (2)}$$

where N and i indicate numbers of foam layers, of which N is an integer of 1 or more, and i is an integer of not less than 1 but not more than N; $D_{i-1}$ indicates the maximum distance between surfaces of a foam of the (i-1)th layer as counted from the center; $T_i$ indicates the thickness of the foam of the i-th layer; and $n_i$ indicates the number of bar-shaped foams in the i-th layer.

14. A composite tube according to claim 13, characterized in that the foam is composed of layers formed by fusing or bonding together bar-shaped foams extruded out of a multi-hole die having two or more holes arranged in two or more concentric circles.

15. A composite tube according to claim 13, characterized in that the expansion ratio of the foam is 5 to 30.

16. A composite tube according to claim 13, characterized in that the foam is formed of a polyolefin-based resin.

17. A composite tube according to claim 13, characterized in that the foam is formed of polypropylene.

18. A composite tube according to claim 13, characterized in that the foaming agent of the foam is carbon dioxide gas.

19. A method of manufacturing a composite tube in which a foaming composition is extruded out of a multi-hole die having two or more holes arranged in one or more concentric circle(s) to cover an outer surface of a tube with a foam, characterized in that the number of holes of the multi-hole die is equal to the number of bar-shaped foams satisfying the condition of the following formula (2):

[Mathematical Formula 4]

$$\frac{\pi}{2.5} \frac{D_{i-1} + T_i}{T_1} < n_i < \frac{\pi}{0.5} \frac{D_{i-1} + T_i}{T_i} (1 \leq i \leq N) \quad \text{Formula (2)}$$

where N and i indicate numbers of foam layers, of which N is an integer of 1 or more, and i is an integer of not less than 1 but not more than N; $D_{i-1}$ indicates the maximum distance between surfaces of a foam of the (i-1)th layer as counted from the center; $T_i$ indicates the thickness of the foam of the i-th layer; and $n_i$ indicates the number of bar-shaped foams in the i-th layer.

* * * * *